(12) United States Patent
van Stiphout

(10) Patent No.: US 8,616,713 B2
(45) Date of Patent: Dec. 31, 2013

(54) DRIVE UNIT FOR MIRROR ADJUSTMENT MECHANISM

(75) Inventor: Paulus Gerardus Maria van Stiphout, Woerden (NL)

(73) Assignee: MCi (Mirror Controls International) Netherlands B.V., Montfoort (NL)

( * ) Notice: Subject to any disclaimer, the term of this patent is extended or adjusted under 35 U.S.C. 154(b) by 357 days.

(21) Appl. No.: 13/126,242

(22) PCT Filed: Oct. 28, 2009

(86) PCT No.: PCT/NL2009/050651
§ 371 (c)(1),
(2), (4) Date: Jul. 7, 2011

(87) PCT Pub. No.: WO2010/050809
PCT Pub. Date: May 6, 2010

(65) Prior Publication Data
US 2011/0261476 A1    Oct. 27, 2011

(30) Foreign Application Priority Data
Oct. 28, 2008   (NL) ...................................... 2002145

(51) Int. Cl.
*G02B 5/10* (2006.01)
(52) U.S. Cl.
USPC ......................................................... 359/877

(58) Field of Classification Search
USPC .................................. 359/838–883, 399–431
See application file for complete search history.

(56) References Cited

U.S. PATENT DOCUMENTS

| 4,786,157 A | 11/1988 | Mori et al. | |
| 2005/0255957 A1* | 11/2005 | Miller et al. | 475/214 |

FOREIGN PATENT DOCUMENTS

| DE | 202005008274 U1 | 10/2005 |
| GB | 2157387 A | 10/1985 |
| JP | 62191249 A | 8/1987 |
| JP | 2008007307 A | 1/2008 |

OTHER PUBLICATIONS

European Patent Office; International Search Report and Written Opinion issued in corresponding International Application No. PCT/NL2009/050651. Date of Mailing: Dec. 21, 2009.

* cited by examiner

*Primary Examiner* — Jennifer L. Doak
(74) *Attorney, Agent, or Firm* — Dykema Gossett PLLC

(57) ABSTRACT

A drive unit for a mirror adjustment mechanism includes a housing and a drive motor mounted in the housing for driving a drive train. In an embodiment, the drive train comprises a planetary gear system. The drive train may include a coupling to the housing and, in an embodiment, the coupling may comprise a ratchet coupling. Further, in an embodiment, the housing and the drive train may be provided with a ratchet element.

14 Claims, 4 Drawing Sheets

DRIVE UNIT FOR MIRROR ADJUSTMENT MECHANISM

CROSS-REFERENCE TO RELATED APPLICATION

This application is a national stage filing based upon International PCT Application No. PCT/NL2009/050651, with an international filing date of Oct. 28, 2009, which claims the benefit of priority to Netherlands Application No. 2002145, filed Oct. 28, 2008, each of which applications are fully incorporated herein by reference as though fully set forth herein.

TECHNICAL FIELD

The invention relates to a drive unit for a mirror adjustment mechanism comprising a housing, a drive motor mounted in the housing for driving a drive train, wherein the drive train is coupled to the housing.

BACKGROUND

Drive units are generally known and are widely applied in minors for a motor vehicle. Usually the drive train is coupled to the housing via a slip coupling. During manual adjustment of the mirror or at the end of an adjustment path, the slip coupling may be released and the drive train may slip with respect to the housing.

A drawback of the known drive unit is that the release moment of the slip coupling may be unreliable, which may result in an overloaded motor. Also, manual adjustment of the mirror may be inaccurate. Further, the known drive unit comprises a relatively complex structure and may be less suited for automated assembly. Also, the drive unit may be subject to vibrations that may shorten the life time.

SUMMARY

The invention contemplates a drive unit in which the above drawbacks may be avoided. To this end, the invention provides a drive unit for a mirror adjustment mechanism comprising a housing, a drive motor mounted in the housing for driving a drive train which comprises a planetary gear system, wherein the drive train comprises a coupling to the housing, and wherein the coupling comprises a ratchet coupling.

By providing a ratchet coupling between the drive train and the housing, the structure of the drive unit may comprise fewer parts. A drive unit comprising fewer parts may be manufactured and/or assembled more efficient and more cost effective, e.g. via automated assembly. Also, by providing a ratchet coupling, a more reliable release moment may be provided. Since the drive unit may comprise fewer parts, fewer tolerances may be added up and the release moment may become more reliable.

By providing a ratchet element on the housing for cooperation with a ratchet element on the drive train, a relatively simple and cost effective ratchet coupling may be provided. The ratchet element may for example be an integrated pawl or notch or tooth or finger in the housing that may cooperate with grooves or teeth on the drive train. The pawl may e.g. be formed during injection molding of the housing. Also the ratchet element on the drive train may be an integrated part of the drive train, e.g. formed by injection molding.

Also, the drive train may be coupled to the housing via an intermediate part. The intermediate part may provide for a reliable mounting of the drive train in the housing. The intermediate part may comprise a ratchet element for cooperation with ratchet elements on the drive train. For example, the intermediate part may comprise a pawl that can cooperate with grooves on the drive train. In an embodiment, the drive train may comprise at one side a ratchet coupling with the housing and at an opposite side the drive train may comprise a ratchet coupling with the intermediate part.

By providing play in the ratchet coupling, vibration energy of the housing may be dissipated so the housing may be subject to fewer vibrations and the life time of the housing may be extended.

BRIEF DESCRIPTION OF THE DRAWINGS

Further advantageous embodiments of the invention are represented in the subclaims. p The invention will be explained in more detail on the basis of exemplary embodiments shown in the drawing. In the drawing:

DETAILED DESCRIPTION

Figure 1:
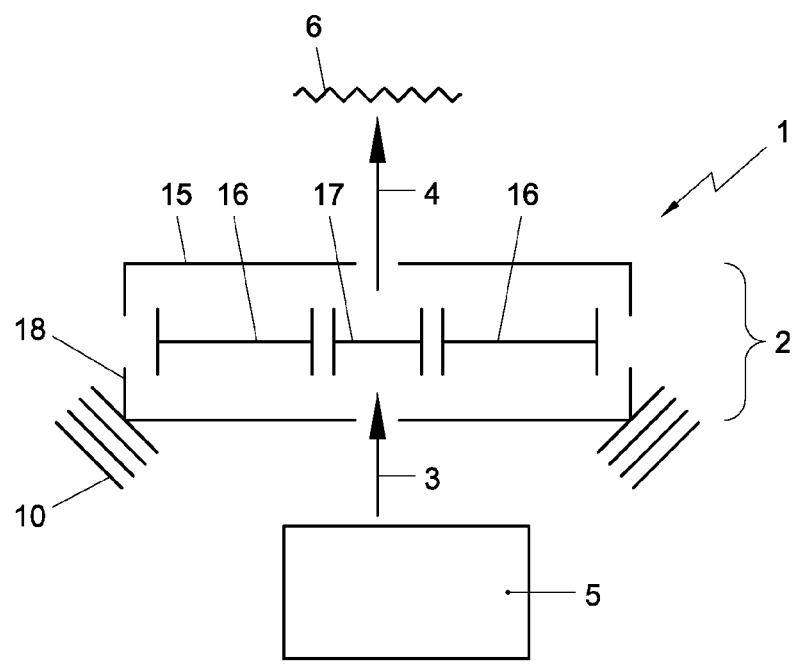
FIG. 1 shows a schematic representation of a drive unit according to the invention.

The figures are only schematic representations of preferred embodiments of the invention. In the figures, similar or corresponding parts are indicated by the same reference numerals.

FIG. 1 shows a schematic representation of a drive unit 1 according to the invention. The drive unit 1 comprises a drive train 2 and has an input axle 3 and an output axle 4. The input axle 3 is driven by a drive motor 5, preferably an electric motor. The drive unit 1 may be comprised in a mirror adjustment mechanism for adjusting e.g. a mirror base plate.

Figure 2:
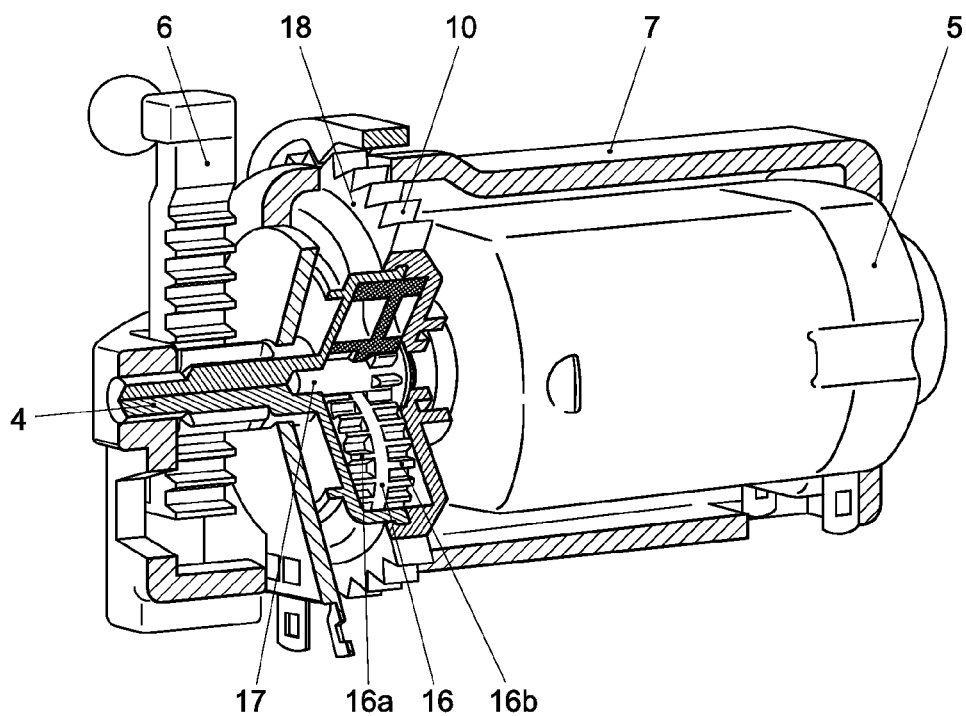
FIG. 2 shows a schematic perspective view of a drive unit according to the invention.

In this embodiment the drive train comprises a planetary gear system 14. Via the planetary gear system 14 the drive motor 5 drives the output axle 4. The output axle 4 can be coupled e.g. to a linear rack 6, as e.g. shown in FIG. 2, to adjust e.g. a mirror base plate.

The planetary gear system 14 comprises a sun wheel 17 which is driven by the drive motor 5 via the input axle 3. Around the sun wheel 17, at least one, but preferably three, planetary wheels 16 are provided. The planetary wheels 16 cooperate with an internally toothed drive ring 15. The drive ring 15 drives via an output axle 4 the linear rack 6. In this embodiment, the planetary wheel 16 comprises two toothed rings 16a and 16b. The toothed ring 16b cooperates with an internally toothed gear ring 18. Ring 15 usually has slightly more teeth than ring 18, which may result in a high transmission ratio. The person skilled in the art will recognize such a planetary gear system as a Wolfrom-planetary gear system.

The drive train 2 is via the gear ring 18 coupled to the housing 7. The coupling with the housing 7 is provided as a ratchet coupling. The gear ring 18 comprises as ratchet elements external teeth 10 for cooperation with a ratchet element 9 on the housing 7. The ratchet element 9 on the housing 7 may be provided as a notch, teeth, finger or pawl on the housing 7. Alternatively, the housing 7 may be provided with an internal toothed ring and a notch or pawl as ratchet element may be provided on the ring 18.

When during adjusting of a mirror base plate the end of the rack 6 is reached rotation of the ring 15 may be blocked while the motor 5 is running. Then, the ratchet coupling between the gear ring 18 and the housing 7 may be released, so the motor 5 will not be overloaded. The ring 18 may then rattle in the housing 7, so an audible signal may be generated that the end of an adjustment path has been reached.

When the drive train 2 is not driven, the planetary gear system 14 is self-blocking. The ring 15 and the ring 18 may not rotate with respect to each other. So, during manual adjustment of the mirror base plate, the ratchet coupling between the ring 18 and the housing 7 may be released, so damaging of the drive train 2 may be prevented. Also, rattling of the ring 18 in the housing 7 gives an audible signal during manual adjustment.

The housing 7 may be manufactured by injection molding, so the ratchet element may be relatively easily integrated in the housing. Alternatively, the ratchet element 9 may be a separate part, e.g. a tooth that may be fixedly mounted to the housing, e.g. via a screw, snap fit or glue connection.

Figure 3:
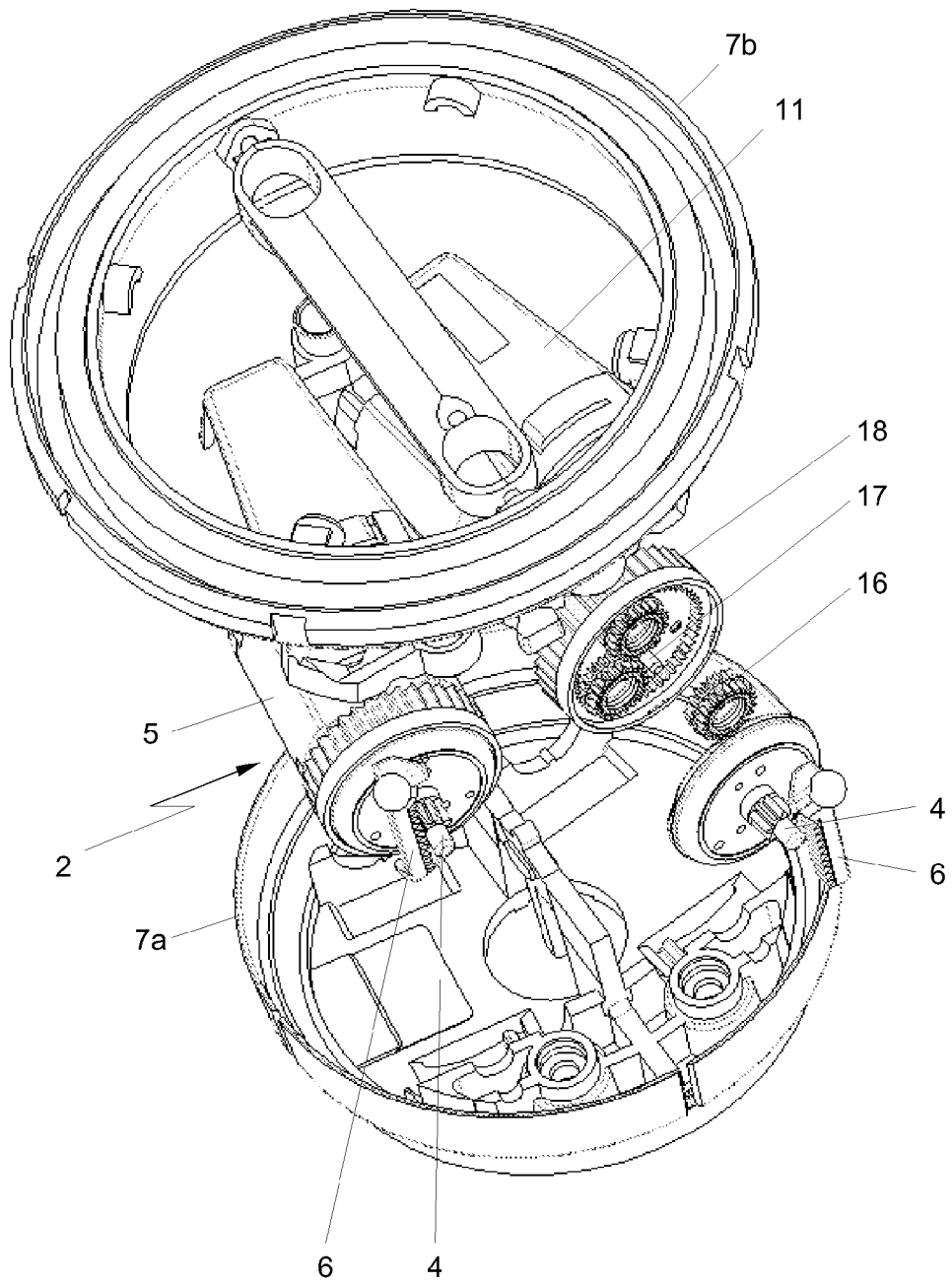
FIG. 3 shows an exploded view of an embodiment of a drive unit according to the invention.

In the embodiment shown in FIG. 3, the drive train 2 is also coupled to the housing 7 via an intermediate part 11. Via the intermediate part 11, the drive train 2 may be more reliably mounted in the housing 7. The intermediate part 11 may also be provided with a ratchet element 9, for example a pawl.

Figure 4:
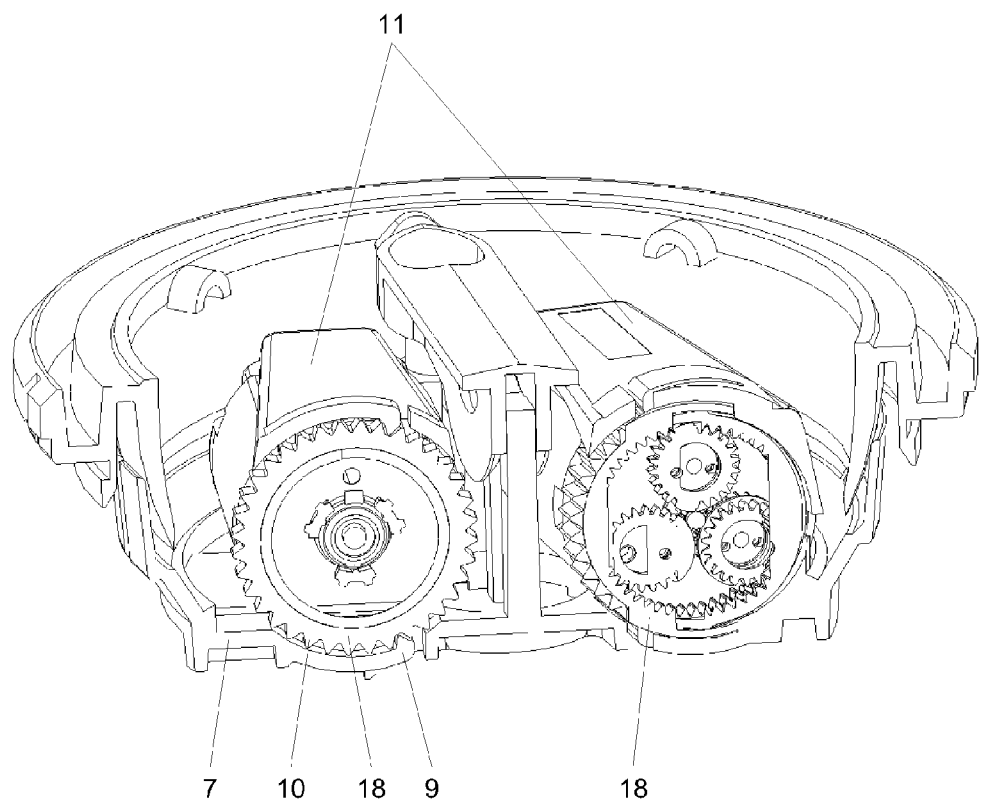
FIG. 4 shows a schematic view of a detail of the drive unit of FIG. 3.

In the embodiment of FIG. 3 and FIG. 4, the intermediate element 11 may be provided as a shell that covers the drive train 2 partially. The intermediate element 11 may be mounted to the housing 7 for example via screws or a snap fit connection. The intermediate element may e.g. be an injection molded part on which the ratchet element 9 may be integrated.

Figure 5:
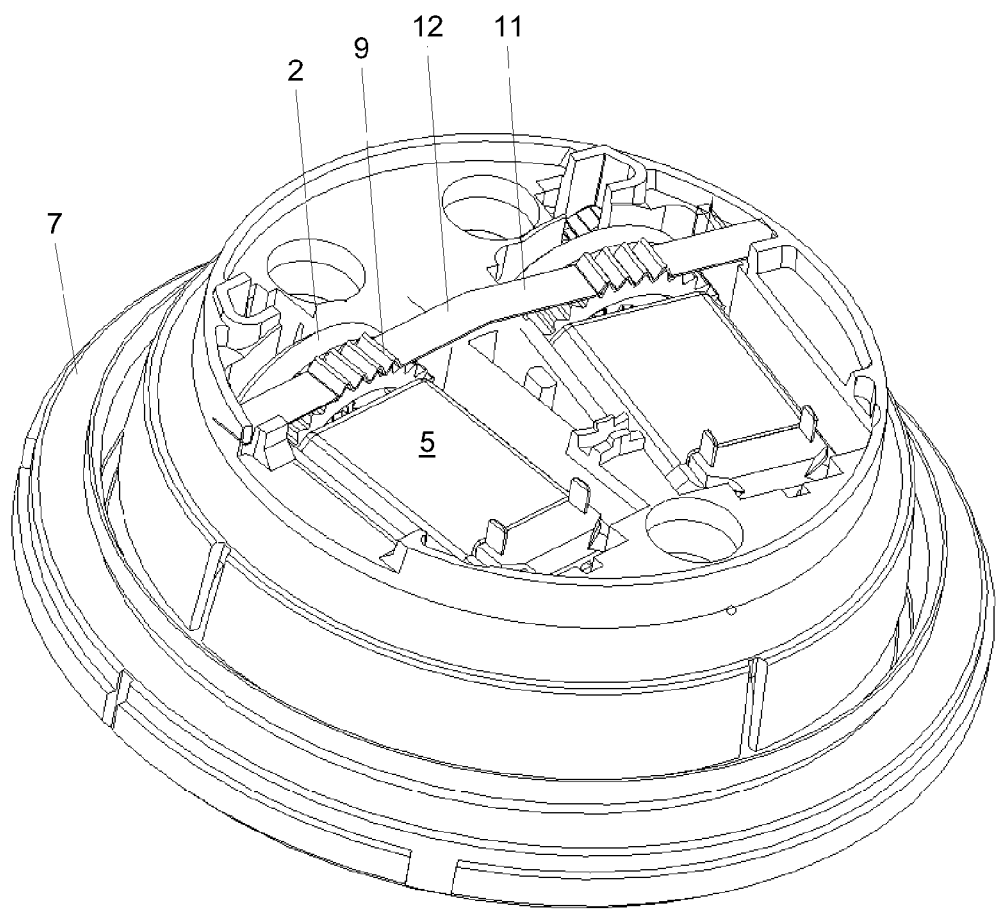
FIG. 5 shows a schematic perspective view of a second embodiment of the drive unit according to the invention.

In the embodiment of FIG. 5, the intermediate element 11 is provided by a spring blade 12. The spring blade 12 comprises teeth 9 for cooperation with teeth 10 on the drive train 2. The spring blade 12 can e.g. be manufactured from metal.

The housing 7 as shown in FIG. 3, FIG. 4 and FIG. 5 comprises two drive units 1. Each drive unit 1 may adjust the mirror base plate in a different direction. The intermediate part 11 may be one part that may be coupled to both drive units 1. Also, each drive unit 1 may be coupled to the housing 7 via a separate intermediate part 11.

In FIG. 3 can be seen that in the shown embodiment the housing 7 comprises two parts, a stationary part 7a and a pivot part 7b. The pivot part 7b may pivot in the stationary part 7a. Housing parts 7a and 7b are usually firmly mounted to each other, though enabling pivoting of the housing parts 7a and 7b with respect to each other. By introducing limited play between the ratchet elements on the housing and the drive train, vibration energy of the housing parts 7a and 7b vibrating with respect to each other may be dissipated via the play in the ratchet coupling. The housing parts 7a and 7b may thus be less susceptible to vibrations and the lifetime of the housing parts 7a and 7b may be extended.

Many variants will be clear to the person skilled in the art and are understood to fall within the scope of the invention as set forth in the appended claims.

The invention claimed is:

1. A drive unit for a mirror adjustment mechanism comprising:
    a housing; and
    a drive motor mounted in the housing for driving a drive train, the drive train comprising a planetary gear system;
    wherein the drive train includes a coupling to the housing, and wherein the coupling comprises a ratchet coupling.

2. The drive unit of claim 1, wherein the housing comprises a ratchet element for cooperation with a ratchet element on the drive train.

3. The drive unit of claim 1, wherein the drive train is coupled to the housing via an intermediate part.

4. The drive unit of claim 3, wherein the intermediate part comprises a ratchet element for cooperation with a ratchet element on the drive train.

5. The drive unit of claim 3, wherein the intermediate part comprises a pawl, the drive train includes grooves, and the pawl is configured to cooperate with the grooves on the drive train.

6. The drive unit of claim 1, wherein the drive train, at one side, comprises a ratchet coupling, and, at an opposite side, comprises a ratchet coupling with an intermediate part.

7. The drive unit of claim 1, wherein the ratchet coupling is provided with play.

8. The drive unit of claim 1, wherein the planetary gear system is a Wolfrom planetary gear system.

9. The drive unit of claim 1, including an input axle, the input axle configured to be driven by the drive motor.

10. The drive unit of claim 9, wherein the drive motor comprises an electric motor.

11. The drive unit of claim 1, including an output axle.

12. The drive unit of claim 1, wherein the planetary gear system comprises a sun wheel, the sun wheel configured to be driven by the drive motor via an input axle.

13. The drive unit of claim 12, wherein a planetary wheel is provided around the sun wheel.

14. The drive unit of claim 12, wherein at least three planetary wheels are provided around the sun wheel.

* * * * *

UNITED STATES PATENT AND TRADEMARK OFFICE
CERTIFICATE OF CORRECTION

PATENT NO. : 8,616,713 B2  
APPLICATION NO. : 13/126242  
DATED : December 31, 2013  
INVENTOR(S) : Paulus Gerardus Maria van Stiphout Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 428 days.

Signed and Sealed this

Twenty-second Day of September, 2015

Michelle K. Lee
*Director of the United States Patent and Trademark Office*